United States Patent
Ibuki et al.

(10) Patent No.: US 6,346,287 B1
(45) Date of Patent: Feb. 12, 2002

(54) PROCESS FOR PRODUCING BAKED SNACKS

(75) Inventors: Masahisa Ibuki; Ichiro Nakamura, both of Izumisano (JP)

(73) Assignee: Fuji Oil Company, Limited, Osaka-fu (JP)

( * ) Notice: Subject to any disclaimer, the term of this patent is extended or adjusted under 35 U.S.C. 154(b) by 0 days.

(21) Appl. No.: 09/554,311

(22) PCT Filed: Sep. 28, 1999

(86) PCT No.: PCT/JP99/05294

§ 371 Date: May 12, 2000

§ 102(e) Date: May 12, 2000

(87) PCT Pub. No.: WO00/18242

PCT Pub. Date: Apr. 6, 2000

(30) Foreign Application Priority Data

Sep. 28, 1998 (JP) .......................................... 10-274036

(51) Int. Cl.[7] .............................. A21D 2/16; A21D 2/18
(52) U.S. Cl. ........................ 426/450; 426/499; 426/517; 426/653
(58) Field of Search ................................ 426/450, 499, 426/517, 653

(56) References Cited

U.S. PATENT DOCUMENTS 4,578,274 A  *  3/1986  Sugisawa et al. ............. 426/96

* cited by examiner

*Primary Examiner*—Nima Bhat
(74) *Attorney, Agent, or Firm*—Wenderoth, Lind & Ponack, LLP

(57) ABSTRACT

A process for producing baked snacks such as crackers and pretzels. By using this process, baked snacks can be easily produced without any restriction in the composition (moisture content, oil content, etc.) or the production procedure for avoiding blistering, as in the conventional processes.

2 Claims, No Drawings

PROCESS FOR PRODUCING BAKED SNACKS

This application claims benefit under 35 U.S.C. 371 of PCT/JP99/05294.

ART FIELD RELATED

The present invention relates to a process for producing baked snack confectionery such as pretzel, cracker and the like. More specifically, it relates to a process for producing baked snack confectionery which is hardly blistered upon baking even if dough is prepared without rolling and molding, or piercing to form openings.

BACKGROUND OF THE INVENTION

Baked snack confectionery such as pretzel, cracker, or the like is confectionery whose main ingredient is wheat flour. In general, a cracker or pretzel is produced by baking dough obtained by leavening and molding the raw material, wheat flour, blended with yeast or baking powder. In comparison with a biscuit, a cracker or pretzel has a lower content of fat such as shortening, emulsified fat and the like and a lower sugar content, thereby accelerating gluten formation. Then, unless evaporation of water upon baking and puffing proceeds efficiently, a tough gluten network is formed, which inhibits evaporation of water and results in blisters and formation of an inhomogeneous porous inner structure. Thus, product salability is deteriorated.

For preventing blisters, in general, dough is pierced and then subjected to puffing and baking. However, in this method, there is such a defect that formation of openings in the resultant product cannot be avoided. Then, other various attempts have been made.

For example, JP-B 5-17821 discloses a method for preventing blisters, wherein dough in the form of chips is obtained by subjecting raw material flour to mixing, rolling, boiling and cooking, molding and the like, followed by adjusting the dough to a given certain water content by a primary drying, and pressing the dough with maintaining it at a given certain dough temperature to form small cracks on the surface thereof to facilitate removal of water.

In addition, from the viewpoints of both formulations and production steps, attempts also have been made and JP-A 6-327396 discloses that large blisters can be prevented by using as main raw materials wheat flour and starch; blending them with certain amounts of live yeast, yeast food, vital gluten, refined sugar, salt and margarine to obtain dough; adjusting the resultant dough to a certain water content; storing the dough under refrigeration for a certain period of time; molding; drying; and then baking, thereby facilitating removal of water upon baking.

Although these methods have achieved advantages to some extent, their applicability is restricted to a specific range because a water content and production steps are limited and advantages are observed in only certain limited formulations.

DISCLOSURE OF THE INVENTION

PROBLEM SOLVED BY THE INVENTION

The present invention relates to a process for producing baked snack confectionery such as cracker, pretzel and the like. An object of the present invention is to provide the process, wherein baked snack confectionery can be readily produced with minimizing blisters without paying attention to the restriction required in both formulations such as water content, fat content and the like, and production steps in a conventional method.

SUMMARY OF THE INVENTION

The present inventors have studied intensively to achieve the above object. As a result, the present inventors have found that blisters upon baking can be prevented without paying attention to a fat content and a water content by blending baked snack confectionery dough of cracker or pretzel type, whose main ingredient is wheat flour, with fat powder having a specific melting point. Thus, the present invention has been completed. That is, the present invention is a process for producing baked snack confectionery which comprises adding fat powder having a melting point of 45° C. to 75° C. to cereal powder whose main ingredient is wheat flour in an amount of 0.2 to 10% by weight based on the weight of the cereal powder.

Although the mechanism for preventing blisters of baked snack confectionery such as cracker and pretzel by addition of the fat powder having the high melting point in the present invention is not fully elucidated, it is considered that the fat powder having the high melting point added forms fine openings throughout a cracker or pretzel, thereby facilitating water removal through the openings to prevent blisters.

In the present invention, the word "baked snack confectionery" refers to confectionery whose main ingredient is wheat flour such as cracker, pretzel and the like. The confectionery is produced by blending cereal flour including the main ingredient with a leavening agent, among others, yeast and/or baking powder to form dough, subjecting the resultant dough to leavening or fermentation, molding and then baking. In comparison with a normal biscuit, the amounts of fat such as shortening, emulsified fat and the like are smaller (the fat content is at most 20% by weight based on cereal flour whose main ingredient is wheat flour) with lowering a sugar content (at most 20% by weight based on the same cereal flour) to relatively accelerate formation of gluten. The advantages according to the process of the present invention such as prevention of blisters, etc., can be exhibited in products having lower fat and sugar contents of dough as described above. The cereal flour to be used other than wheat flour is not limited to a specific one, and examples thereof include rye flour, barley flour, corn flour, rice flour and the like. In the cereal flour to be used as the raw material, preferably, 80% by weight or more is wheat flour.

The fat used in the present invention is not limited to a specific one in so far as it is edible. Examples thereof include hydrogenated and interesterified products of palm oil, rapeseed oil, soybean oil, sunflower oil, corn oil, cottonseed oil, safflower oil, rice bran oil, coconut oil, palm kernel oil and the like.

The fat should be in the form of powder. When it is in the form of liquid or paste, crispy mouthfeel cannot be obtained. The powder form includes any form in so far as it can be called as powder. For example, it may be, for example, in the form of scales, globes, rods and the like. The production process of the fat powder is not specifically limited. For example, there are spray cooling process wherein melted fat is sprayed into a chiller to form powder, drum flake process wherein melted fat is poured on a cooled drum to solidify the fat and scrape the solidified fat, and the like. Particle size of fat powder is not specifically limited in so far as the powder has average particle size of not less than 0.1 mm. Preferably, the powder has such particle size that it can be readily blended with cereal flour such as wheat flour to be used, preferably, the powder should pass through 10# JIS standard sieve. When powder having average particle size of less than 0.1 mm, the fine openings as mentioned above are not formed and the desired advantages of the present invention cannot be achieved. For example, although a fat composition obtained by emulsifying fat with a saccharide, protein or emulsifying agent is also called as "fat powder" and has large apparent particle size, its powder particles are formed by aggregation of many fine fat particles and the saccharide, protein and the like and its substantial particle size is very small (about 10 micron). Then, the desired advantages are hardly expected.

The fat powder having the high melting point used in the present invention should be used in an amount of 0.2 to 10% by weight, preferably 0.5 to 5% by weight, more preferably 1 to 3% by weight based on the cereal powder whose main ingredient is wheat flour. When the amount is less than 0.2% by weight, blisters are caused in the resultant cracker and pretzel. When the amount is more than 10% by weight, a powdery flavor is caused in the resultant cracker or pretzel and this adversely influences the flavor of the end product.

Further, the melting point of the fat powder should be 45° C. to 75° C., preferably 50° C. to 65° C. When the melting point is lower than 45° C., the powder is melted at once upon baking and blisters cannot be prevented. When the melting point is higher than 75° C., the resultant cracker or pretzel become hard. This is undesired from the viewpoint of mouthfeel.

The production process of the cracker or pretzel of the present invention is not limited to a specific one and any conventional process can be employed. For example, the fat powder having the high melting point is added to a part or almost all of wheat flour, followed by addition of water or cow milk. The resultant mixture is mixed with yeast and allows to leaven for about 18 hours. Then, the remaining raw materials are added to this and the mixture is mixed. Then, the mixture further allows to leaven for about 4 hours to obtain dough. The dough is rolled and molded by stamping. The molded dough is baked in an oven heater at 260° C. to 320° C. to obtain a cracker. For producing a pretzel, for example, the above dough (provided that leavening time is shorter) is molded in the form of sticks and, after treatment with an alkali (passing through an alkaline hot water bath to put a gloss on its surface), sticks are baked at about 230° C.

The fat powder having the high melting point can be added at any time prior to baking in the production steps of a cracker or pretzel in so far as it can be mixed or blended with other ingredients. Preferably, the fat powder is blended with wheat flour and starch used beforehand, resulting in homogenous mixing or blending and excellent operating characteristics.

EXAMPLES
and
Comparative Examples

The following Examples further illustrate the present invention.

Examples 1–3 and Comparative Examples 1–2

Refined palm oil was fully hydrogenated and melted with heating completely. Then, the melted fat was poured on a cooled drum to solidify it. The solidified fat is scraped and pulverized. The pulverized fat was passed through 10# sieve to obtain fat powder having a high melting point (fat powder A). The melting point of the fat powder is 58° C. and the fat had average particle size of 0.35 mm. According to the formulation shown in Table 1, pretzel dough was prepared as an all-in-one mix using the fat powder A with Kenwood mixer. Fat obtained by adding oleic acid monoglyceride (1%) and sorbitan monooleate (1%) to edible rapeseed oil was used as the emulsified fat in Table 1. The dough thus prepared was rolled to 2 mm in thickness and molded in the form of rods of 10 mm long. They were baked at 175° C. for 20 minutes to obtain a pretzel (baking was carried out at a lower temperature for longer time because an alkaline treatment was omitted). The results of evaluation by tasting each sample are shown in Table 2.

TABLE 1

Formulation (g)

| Ingredients | Example 1 | Example 2 | Example 3 | Comp. Example 1 | Comp. Example 2 |
|---|---|---|---|---|---|
| Emulsified fat | 5 | 5 | 5 | 5 | 5 |
| Fat powder A | 0.5 | 2 | 5 | 0.1 | 12 |
| Wheat flour (medium strength) | 100 | 100 | 100 | 100 | 100 |
| Baking powder | 0.2 | 0.2 | 0.2 | 0.2 | 0.2 |
| Water | 40 | 40 | 40 | 40 | 40 |

TABLE 2

Results of organoleptic evaluation

| Evaluation items | Example 1 | Example 2 | Example 3 | Comp. Example 1 | Comp. Example 2 |
|---|---|---|---|---|---|
| Appearance (presence or absence of blisters) | absent | absent | absent | present | absent |
| Mouthfeel | crispy good | crispy good | crispy good | hard bad | powdery bad |

As seen from the above results, the baked snack confectionery of the present invention has crispy mouthfeel without blisters and is very good. The results of the Comparative Examples show that blisters are cause, when the amount of the fatty powder added is less than that of the present invention, and that a powdery flavor is caused though no blister is caused, when the amount is larger than that of the present invention, resulting in deterioration of product salability.

Examples 4 and 5 and Comparative Example 3

Refined rapeseed oil was hydrogenated to obtain hydrogenated rapeseed oils having various melting points. Each of them was melted completely and sprayed in a chiller at 5° C. to obtain fat powder. The fat powder was passed through 10# sieve. In all, three fat powders having different high melting points were obtained (fat powder B, C and D).

The melting point thereof was as follows: fat powder B: 40° C., fat powder C: 63° C. and fat powder D: 72° C.

The average particle size was as follows: fat powder B: 0.45 mm, fat powder C: 0.35 mm and fat powder D: 0.30 mm.

According to the formulation shown in Table 3, a cracker was obtained by using each of these fat powders, adjusting the temperature of a sponge after mixing to 23° C., followed by allowing it to leaven for 18 hours in a fermentation room at 25° C. to 30° C. and humidity of 70 to 80%. The remaining raw materials were added to the sponge and the mixture was subjected to main mixing for about 5 minutes to obtain dough. The dough was further leavened in a fermentation room for 4 hours. Then, the dough was rolled to 2 mm in thickness and molded by stamping with a metal mold of 40 mm diameter. The molded dough was baked in an oven at 275° C. for 3 minutes to obtain a cracker. According to the same manner, organoleptic evaluation of the resultant crackers was carried out. The results are shown in Table 4.

TABLE 3

Formulation (unit = g)

| Ingredients | Example 4 | Example 5 | Comp. Example 3 |
|---|---|---|---|
| Sponge wheat flour (medium strength) | 70 | 70 | 70 |
| Yeast | 0.25 | 0.25 | 0.25 |
| Water | 30 | 30 | 30 |
| Wheat flour for main mixing (weak strength) | 30 | 30 | 30 |
| Emulsified fat | 5 | 5 | 5 |
| Fat powder B | — | — | 3 |
| Fat powder C | 3 | — | — |
| Fat powder D | — | 3 | — |
| Maltose syrup | 1.5 | 1.5 | 1.5 |
| Salt | 1.5 | 1.5 | 1.5 |
| Sodium bicarbonate | 0.65 | 0.65 | 0.65 |

TABLE 4

Organoleptic evaluation

| Ingredients | Example 4 | Example 5 | Comp. Example 3 |
|---|---|---|---|
| Appearance (absence or presence of blisters) | absent | absent | present |
| Mouthfeel | crispy good | crispy good | hard bad |

As seen from the above results, the baked snack confectionery of the present invention has crispy mouthfeel without blisters.

In a conventional cracker or pretzel whose main ingredient is wheat flour, there is such a drawback that blisters are caused unless dough is pierced to form openings. On the other hand, according to the present invention, it has been found that formation of blisters can be prevented by addition of the fat powder having the melting point of 45° C. to 75° C. to obtain baked snack confectionery having crispy mouthfeel. Then, this becomes a useful process for producing baked snack confectionery whose water and fat contents or production steps are limited, or whose product shape is limited due to formation of openings by piercing.

What is claimed is:

1. A process for producing baked snack confectionery which comprises adding fat powder having a melting point of 45° C. to 75° C. to cereal powder wherein the main ingredient is wheat flour in an amount of 0.2 to 10% by weight based on the weight of the cereal powder.

2. The process for producing baked snack confectionery according to claim 1, wherein the melting point of the fat powder is 50° C. to 65° C.

* * * * *